Jan. 7, 1958 G. O. LEGGETT 2,818,753
REVERSE TAPER BORING TOOL
Filed Aug. 20, 1956 2 Sheets-Sheet 2

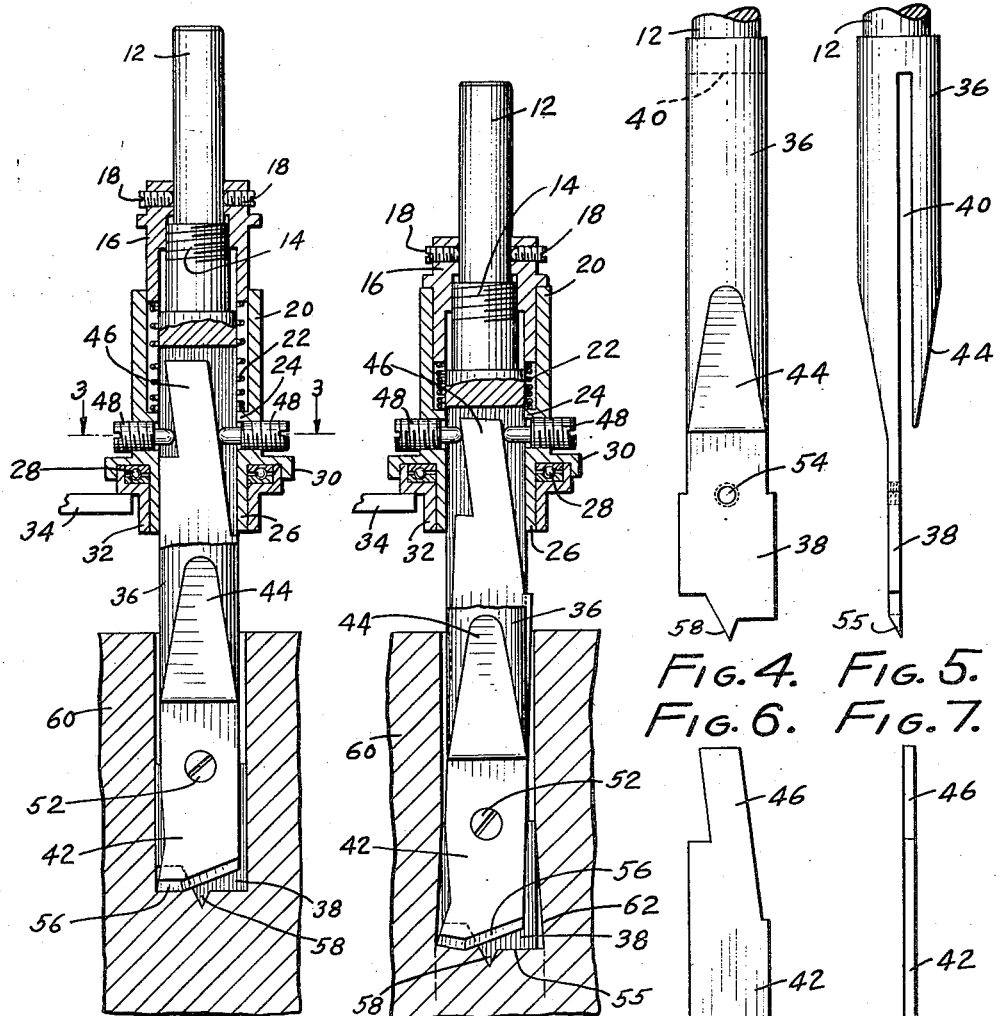
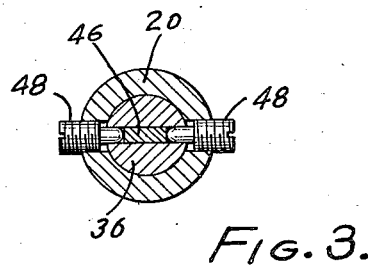
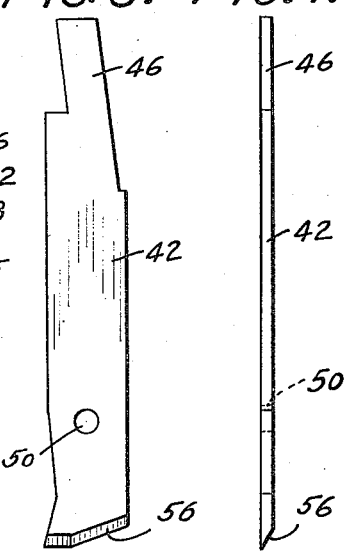

INVENTOR.
GUY O. LEGGETT
BY
ATTORNEY

United States Patent Office 2,818,753
Patented Jan. 7, 1958

2,818,753
REVERSE TAPER BORING TOOL
Guy O. Leggett, Van Nuys, Calif.
Application August 20, 1956, Serial No. 605,177
12 Claims. (Cl. 77—58)

This invention relates to an improved reverse taper boring tool and has for one of its principal objects the provision of a device of the class described which includes a construction whereby practically all of the drilling or boring is accomplished by a unitary solid element of steel or the like, which will provide strength, prevent chattering and will add considerably to the longevity of the tool itself.

One of the important objects of the invention is to produce a boring tool with a reverse taper, wherein a second movable cutting bit is attached to the main element by a fulcrum or pivot point and in such a manner that foreign materials, such as cuttings and borings, cannot enter into the space between the elements, and thereby adversely affect the operation.

Another object of the invention is to provide a tool for boring tapered holes in practically any material which includes an adjustment whereby the hole diameter can be always maintained, regardless of sharpening of the tool itself and also for graduating the hole diameter of any desired cut.

Still another object of the invention is the provision, in a reverse taper boring tool, of an automatically controlled delay action whereby a straight wall pattern of a hole can be drilled for a partial depth thereof, after which a secondary bit comes into action to enlarge the lower end of the hole into a reverse taper pattern.

Yet another object of the invention is the production of a boring tool or similar device, which includes a second cutting bit, which will perform all of its cutting action on the bottom of the bit, leaving a hole having a flat bottom and including a secondary element at the top of the bit which may be rotated by a suitable tool, thereby causing the second bit to vary the amount of reverse taper cut.

Another and still further important object of the invention is to provide a tool of this type, wherein a ball-bearing race is included in the structure, with a threaded sleeve on its lower portion, said sleeve being fitted with a tube extending downwardly to almost the bottom of the bit and which will contact the surface being drilled when the bit is being employed in a portable electrical device.

Other and further important objects of the invention will be apparent from the disclosures in the accompanying drawings and following specification.

The invention, in a preferred form, is illustrated in the drawings and hereinafter more fully described.

In the drawings:

Figure 1 is an elevation, partly in section, showing the improved reverse taper boring tool of this invention.

Figure 2 is a view similar to Figure 1, but illustrating the tool in a further extended position for an additional and tapered drilling operation.

Figure 3 is a section on the line 3—3 of Figure 1, looking in the direction indicated by the arrows.

Figure 4 is a plan view of the main element and cutting blade of the boring tool of this invention.

Figure 5 is a side elevation of the structure of Figure 4.

Figure 6 is an elevation of the secondary cutting blade or bit of this invention.

Figure 7 is an elevation of the blade illustrated in Figure 6.

As shown in the drawings:

Figure 8:
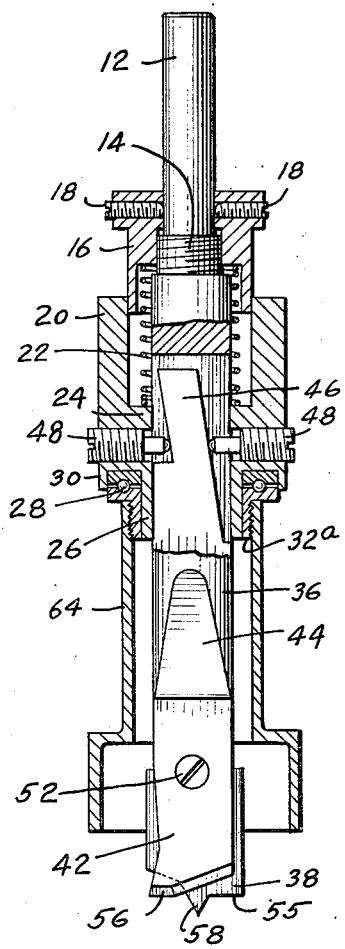
Figure 8 is a view similar to Figure 1 but showing a modified form of the invention.

The reference numeral 12 indicates generally the main operating shaft of the reverse taper boring tool of this invention, and supported upon the upper end of this shaft, preferably by screw threads 14, is a cylindrical cap element 16, which is held in desired position on the shaft by means of set screws or the like 18.

A further cylindrical element 20 is slidably fitted onto the lower exterior of the cylinder 16 and a helical spring 22 is interposed between the bottom of the sleeve 16 and a shoulder 24 which is integral with the inner periphery of the sleeve 20 and comprises a lower continuation thereof, as shown at 26. A ball race 28 is fitted inside an annular extension 30 of the sleeve 20—26 and this is held in position by means of a cap or the like 32. This cap is shouldered as shown in Figures 1 and 2 and adapted to contact a stop or some such similar structure 34 when the tool is operated.

The lower end of the shaft 12 comprises an annular shouldered integral extension 36 which assists in maintaining the cap 16, the spring 22 and the cylinder 20—26 in desired operating position at all times, and this extension 36 then continues downwardly through the sleeve 20—26 with a sliding fit, terminating in an integral blade or cutting element 38 (Figures 4 and 5).

As best shown in Figure 5, the extension 36 of the shaft 12 is slotted or bifurcated as at 40, this being for the reception of a cooperating and secondary cutting blade 42 (Figures 6 and 7). This blade 42 is fitted into and operates in the slot 40 in the element 36, which element 36 is preferably exteriorly flat tapered as best shown at 44 in Figures 4 and 5.

As best shown in Figure 6, the blade 42 has its upper end 46 shaped to provide a cam action and this action is accomplished by means of a pair of adjusting pins 48, screw threadedly mounted in suitable openings in the cylinder 20 (Figure 2) and the blade itself is snugly but movably fitted into the slot 40 in such a relation that no foreign matter can enter when the device is operated. The blade 42 is provided with an opening 50, adjacent its lower end and a pivot pin or screw 52 passes through this opening, being fastened in one of two aligned openings 54 in the blade portion 38 of the element 12—36.

Suitable cutting edges are provided on the lower ends of the blades 38 and 42, as shown at 55 and 56, respectively, and a centering point 58 forms part of the blade 38. Sharpening of edges and points can be readily accomplished.

The blade 42—46 pivots about the pin 52 in its opening 50 but in normal or first operation in the drilling or boring of a hole in a piece of work such as that indicated at 60, a simple straight slided opening results. However, when the ball race casing 32 contacts the stop 34, and the tool continues to be rotatably impelled further into the work, the cylinder 20 will be pushed upward with respect to the cylinder 16 against the tension of the spring 22 and the blade 42 will be constrained to shift about its pivot point 52 because of the cam action of the pins 48 against its upper end 46. This will shift the lower cutting edge 56 of the blade 42 and as the tool progresses downwardly a correspondingly widened taper of the opening in the work 60 will result, all as best shown at 62 in Figure 2. The hole can therefore be drilled to the desired depth, size and taper and when the tool is withdrawn, the blade 46 will resume its normal position so that the straight sides of the first or upper part of the hole or opening in the work 60 will not be marred or otherwise changed.

A slightly modified form of the invention is illustrated in Figure 8, wherein the device can be used with a portable drill and instead of the stop 34, an auxiliary sleeve or the like 64 is employed which is screw threaded onto the correspondingly screw threaded end of the ball race casing 32A. This can be arranged to contact the work at a desired point, wherein a tapered bored hole will result, the same as is shown at 62 in Figure 2. All of the other parts are substantially the same with the exception that the sleeve 20 may have thicker walls, if desired.

Figure 9:
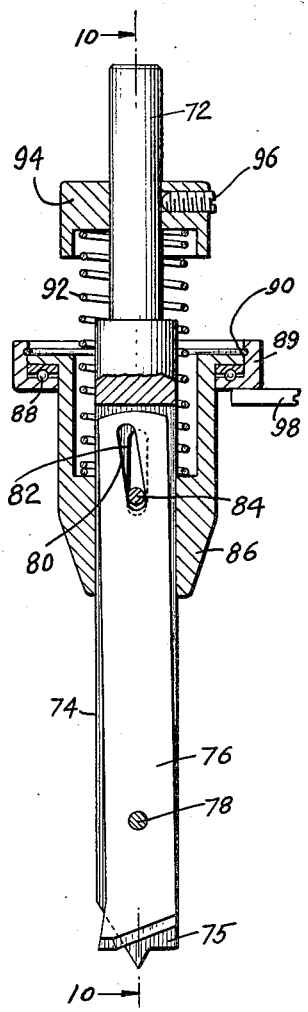
Figure 9 illustrates a further modification.
Figure 10:
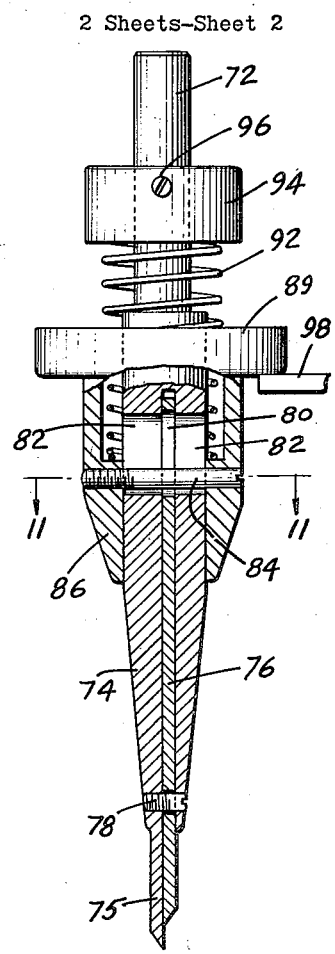
Figure 10 is a vertical section on the line 10—10 of Figure 9, looking in the direction indicated.
Figure 11:
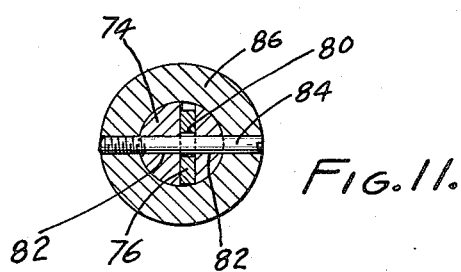
Figure 11 is a horizontal section on the line 11—11 of Figure 10 looking downwardly.

A further modification is illustrated in Figure 9, wherein a shaft 72 supports a combination bifurcated blade holder and cutting element 74—75 with an auxiliary or secondary cutting blade or bit 76 mounted in the bifurcation in a manner similar to that illustrated in Figures 1 to 5 inclusive. In this construction a screw 78 provides a pivotal point for the auxiliary or secondary blade 76 and this is provided with an offset or angularly disposed slot 80 in its upper end. The body portion of the main blade element 74 also has two aligned vertical slots 82 and a pin 84 passes through the three slots, this pin being mounted in a case or housing 86, which in turn supports a ball race 88. The ball race 88 is held in position in its support 89 by means of a snap ring 90 and a helical spring 92 surrounds the shaft 72 and its extension 74, one end of this spring fitting into a suitable cavity in the element 86 and the other end being suported in a cap 94, which is adjustably and shiftably mounted on the shaft 72 by means of a set screw 96.

In this construction, downward movement of the boring tool progresses in a normal drilling operation until such time as the ball race container 89 strikes an adjustable stop or the like 98, whereupon the secondary blade 76 is moved about its pivot in such a manner that a larger diameter hole is completed after the ball race has contacted the stop 98. Here again the tool can be withdrawn without affecting the interior dimensions of the entire hole in any way.

It will be evident that herein is provided a reverse taper boring tool, which will effectively yet simply drill openings of desired and varying dimensions in work of various types, and wherein the taper of the lower portion of openings can be varied as desired with a relatively simple preliminary adjustment.

Furthermore, the tool can be readily constructed, is not expensive, is efficient in operation, cannot bind or stick and sharpening of the edges or points can be made a number of times without in any way affecting the final desired dimensional operational results. Any reduction in dimensions, due to sharpening, can be adequately and suitably compensated by a simple ordinary adjustment.

I am aware that many changes may be made and numerous details of construction varied throughout a wide range without departing from the principles of this invention, and I, therefore, do not propose limiting the patent granted hereon otherwise than as necessitated by the prior art.

I claim as my invention:

1. A reverse taper boring tool comprising a shaft, an integral bifurcated extension of the shaft, a cutting blade comprising an extension of one of the bifurcations, an auxiliary cutting blade in the space between the bifurcations, the auxiliary blade being pivotally mounted with respect to the main blade and including a cam element for shifting it about its pivotal point, the cam element comprising an integral angular extension of the upper end of the blade.

2. A device as described in claim 1, wherein a pair of adjustable pins cooperate with the cammed upper end of the secondary blade.

3. A device as described in claim 2, wherein the bifurcated portion of the main blade is provided with a pair of longitudinal slots adjacent and in partial alignment with the angular slot in the secondary blade, and wherein a pin passes through the slots.

4. A reverse taper boring tool comprising a shaft, an integral bifurcated extension of the shaft, a cutting blade comprising an extension of one of the bifurcations, an auxiliary cutting blade in the space between the bifurcations, a sleeve fitted onto the upper end of the shaft, a second sleeve slidably surmounting a portion of the first sleeve, a spring between the two sleeves and a ball-bearing race fixed on the lower end of the second sleeve.

5. A device as described in claim 4, wherein a support for the ball-bearing race is mounted on the second sleeve.

6. A device as described in claim 5, wherein a cylindrical stop surrounds the assembled blades.

7. A device as described in claim 5, wherein said support comprises a stop extending to a point adjacent the lower ends of the joined blades.

8. A device as described in claim 4, wherein a sleeve surrounds the medial portion of the shaft and blade combination and a ball-bearing race in said sleeve.

9. A device as described in claim 8, wherein an exterior support is provided for the ball-bearing race, said support adapted to contact an adjustable stop.

10. A device as described in claim 9, wherein the second sleeve is an adjustable cap and is mounted on the shaft above the sleeve, and wherein the helical spring surrounds the shaft between the cap and the sleeve.

11. A device as described in claim 10, wherein the cap and the sleeve are both recessed to receive and support the spring.

12. A device as described in claim 11, wherein the sleeve is movable toward and from the cap during operation of the tool and subject to the action of the spring.

References Cited in the file of this patent

UNITED STATES PATENTS

| 578,805 | Annable | Mar. 16, 1897 |
| 2,207,067 | Patscheider | July 9, 1940 |
| 2,325,020 | Shaw | July 20, 1943 |

FOREIGN PATENTS

| 105,408 | Great Britain | Apr. 19, 1917 |
| 518,688 | Great Britain | Mar. 5, 1940 |
| 662,661 | Germany | July 19, 1938 |